Jan. 11, 1927.
L. W. THOMPSON
1,614,217
FLOW METER AND THE LIKE
Filed Jan. 26, 1924
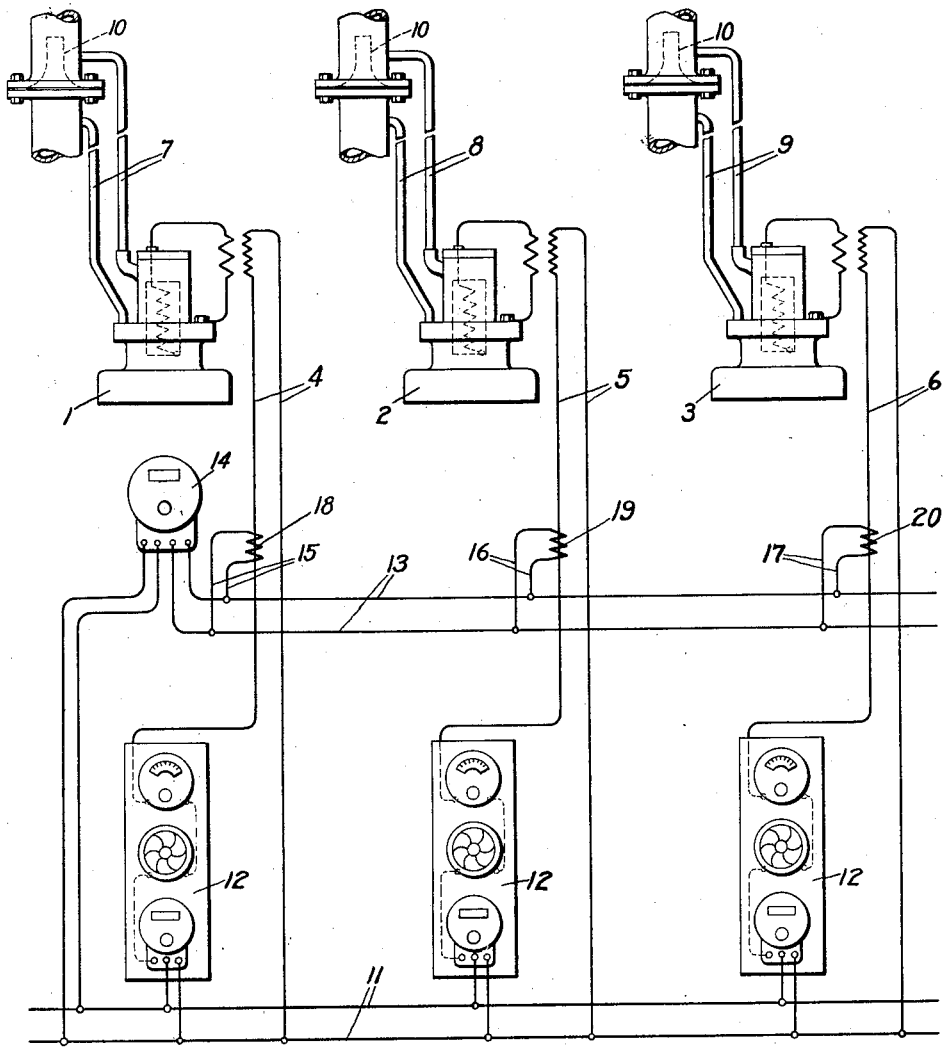
Inventor:
Louis W. Thompson,
by
His Attorney.

Patented Jan. 11, 1927.

1,614,217

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

FLOW METER AND THE LIKE.

Application filed January 26, 1924. Serial No. 688,884.

The present invention relates to instruments such as flow meters and the like and particularly to such instruments when of the so-termed electric type wherein instrumentalities are utilized which produce in an electrical circuit a flow of alternating current proportional to the flow of the factor to be measured. For example, in the case of electric flow meters, a flow of alternating current is produced in an electrical indicating circuit which flow is proportional to the flow of the fluid being metered. A measure of this current is then a measure of the fluid flow and suitable electrical measuring instruments may be placed in the circuit and calibrated to read directly in terms of the flow. Usually, the measuring instruments comprise an indicating ammeter, a curve drawing ammeter, and a watthour meter.

My invention is particularly applicable to flow meters and in the following specification I have described it as applied to flow meters. It is to be understood, however, that the invention is not limited necessarily to this application.

As is well known, a typical electric flow meter comprises a pressure difference creating device which is placed in the conduit through which the fluid to be metered flows and produces a pressure difference which bears a definite relation to the rate of flow, an apparatus upon which said pressure difference acts to produce a flow of electric current proportional to such pressure difference, and measuring instruments for such current.

With such flow meters, the relation between fluid flow and current flow may not be the same for different instruments; that is to say, different flow meters may have different constants, it being understood that by the constant of a flow meter I mean the ratio between the fluid flow units and the current flow units, i. e., the number by which the current units must be multiplied to convert them into fluid flow units. For example, an ampere of current flow in the indicating circuit of one flow meter may represent 100 units of flow while an ampere of current flow in the circuit of another flow meter may represent 200 units of flow, in which case the constant of the first instrument would be 100 and that of the second instrument 200.

In connection with such apparatus, it happens often that several flow meters each having different constants are installed to measure the flow through several conduits and that it is desirable to totalize these flows, and the object of my invention is to provide an improved construction and arrangement whereby the total flow through a number of conduits may be added together and indicated by a single instrument.

According to my invention I provide in connection with the indicating circuits of several flow meters having different constants a totalizing circuit containing a suitable measuring instrument or measuring instruments, and I then connect the totalizing circuit to the indicating circuits by means of branch circuits which connect to the indicating circuit through suitable translating devices which serve to produce in the branch circuits currents of such value that they express the flow in the various indicating circuits in terms of a common constant. An instrument in the totalizing circuit calibrated in terms of the common constant will then correctly measure the total flow through the several conduits. As translating instruments I prefer to use ratio current transformers as being the simplest and most convenient.

In the drawing, the figure is a diagrammatic view of a construction embodying my invention.

Referring to the drawing, 1, 2 and 3 indicate several electric flow meters having indicating circuits 4, 5 and 6 in each of which is produced a flow of alternating current proportional to the rate of flow of the fluid being metered by the flow meter to which it is connected. Each flow meter is shown as being connected to a conduit through which fluid to be metered flows by pairs of leading and trailing pressure pipes 7, 8 and 9 and in each conduit is a pressure difference creating device 10. At 11 is indicated the common source of potential for the flow meter indicating circuits, and at 12 are indicated the measuring instruments for the indicating circuits. It is to be understood that the several flow meters shown have different constants.

The arrangement so far described is only by way of example and is to be taken as typical of and representing any suitable electric flow meter construction. In the present instance, I have indicated diagrammatically the type of electric flow meter disclosed in the patent to myself and Jacob W. McNairy, No. 1,560,951, dated November 10, 1925.

Now, according to my invention, I provide a totalizing circuit 13 in which is a suitable electrical measuring instrument 14, such as, for example, a watthour meter, an ammeter, an ampere hour meter or the like. I then connect each flow meter circuit to the totalizing circuit by parallel branch circuits 15, 16 and 17 through the intermediary of ratio current transformers 18, 19 and 20 which have such ratios with respect to the constants of the several flow meters as to serve to translate the currents in the indicating circuits into currents in the branch circuits which have all a common constant; or otherwise expressed, the currents of the several constants are translated into currents of the same constant. The totalizing instrument 14 is then calibrated in terms of the common constant to measure the total flow of fluid in the several conduits.

As a numerical illustration of by invention, assume for example that an ampere of current flowing in indicating circuit 4 represents 100 units of fluid flow, an ampere of current flowing in indicating circuit 5 represents 200 units of flow and an ampere of current flowing in indicating circuit 6 represents 300 units of flow. Under these conditions I may provide current flow in the branch circuits having a common constant of 300 by using a current transformer having a ratio of 3 to 1 in circuit 4, a current transformer having a ratio of 3 to 2 in circuit 5 and a current transformer having a ratio of 3 to 3 in circuit 6. By this means it will be clear that while the currents flowing in the indicating circuits each have a different constant, the currents flowing in the branch circuits each have the same constant. The totalizing instrument, therefore, in adding together these currents flowing in the branch circuits will measure correctly the total flow of fluid through the several conduits.

In connection with the apparatus, it will be seen that the arrangement does not in any way affect adversely the utility or operation of the individual flow meters themselves, each flow meter being a unit in itself and operating in the usual manner to perform its function of measuring the current flow in its individual circuit.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with a number of measuring instruments for measuring different factors wherein each measuring instrument comprises an indicating circuit in which is produced a flow of electric current proportional to the value of one of the factors and a device in the circuit for measuring the current flow in such circuit but wherein the constants of said measuring instruments are different, of means for totalizing said factors comprising a totalizing circuit, branch circuits connecting the totalizing circuit to the indicating circuits, each of such connections being made through a translating device which translates the currents in the indicating circuits into currents in the branch circuits having a common constant, and a totalizing measuring instrument in the totalizing circuit.

2. The combination with a plurality of electric flow meters each comprising an indicating circuit in which is produced a flow of alternating current proportional to the flow of fluid being metered and an instrument in the circuit for measuring the current flow in such circuit, said flow meters having different constants, of means for totalizing the fluid flow measured by said flow meters, said means comprising a totalizing circuit, a ratio current transformer through which each indicating circuit is connected to the totalizing circuit, said current transformers serving to produce in the totalizing circuit currents expressed in terms of a common constant, and a measuring instrument in the totalizing circuit calibrated in terms of the common constant.

In witness whereof, I have hereunto set my hand this 25th day of January, 1924.

LOUIS W. THOMPSON.